J. HAUG.
INTERNAL COMBUSTION ENGINE.
APPLICATION FILED DEC. 21, 1911.
1,071,156.
Patented Aug. 26, 1913.
5 SHEETS—SHEET 4.
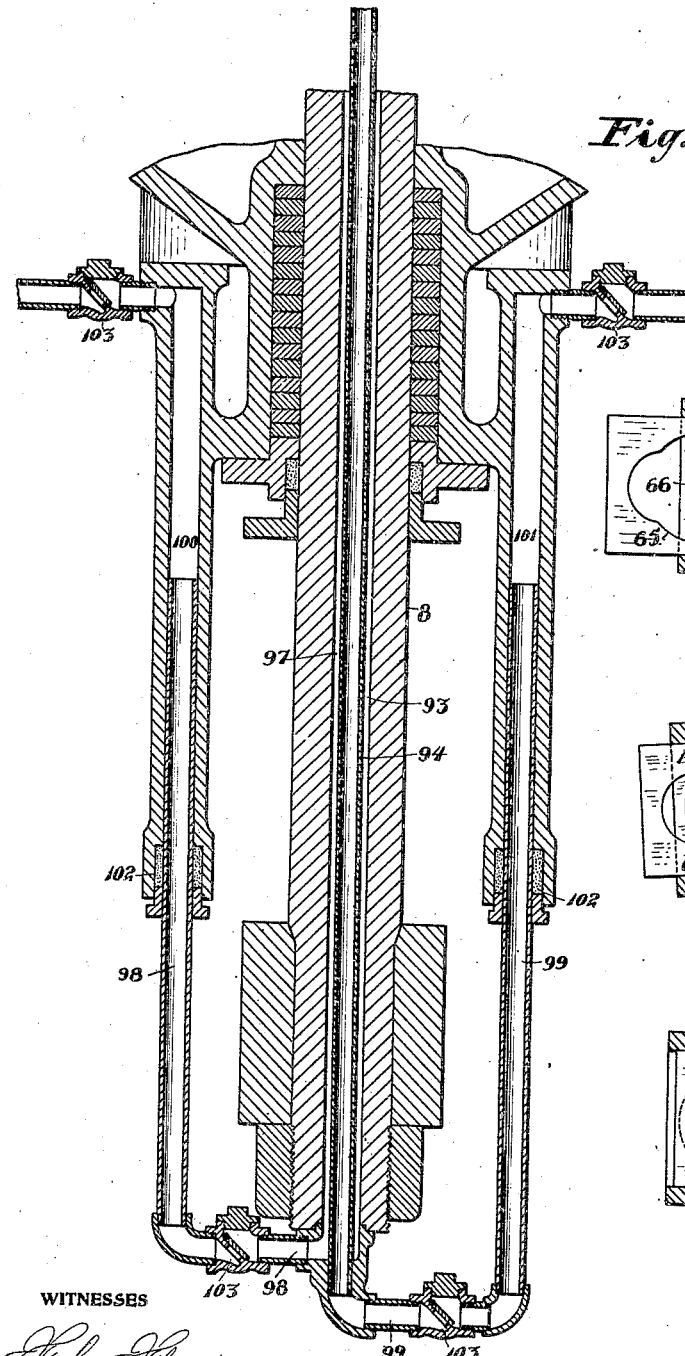
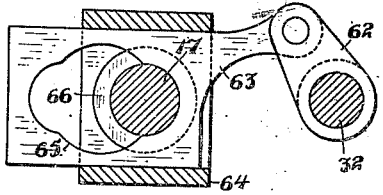
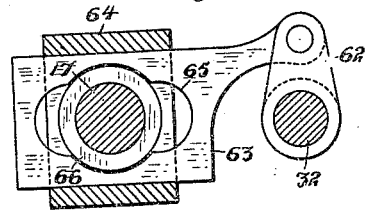
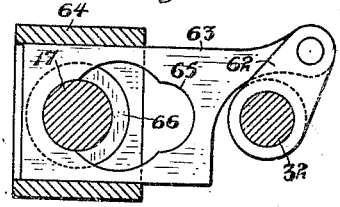

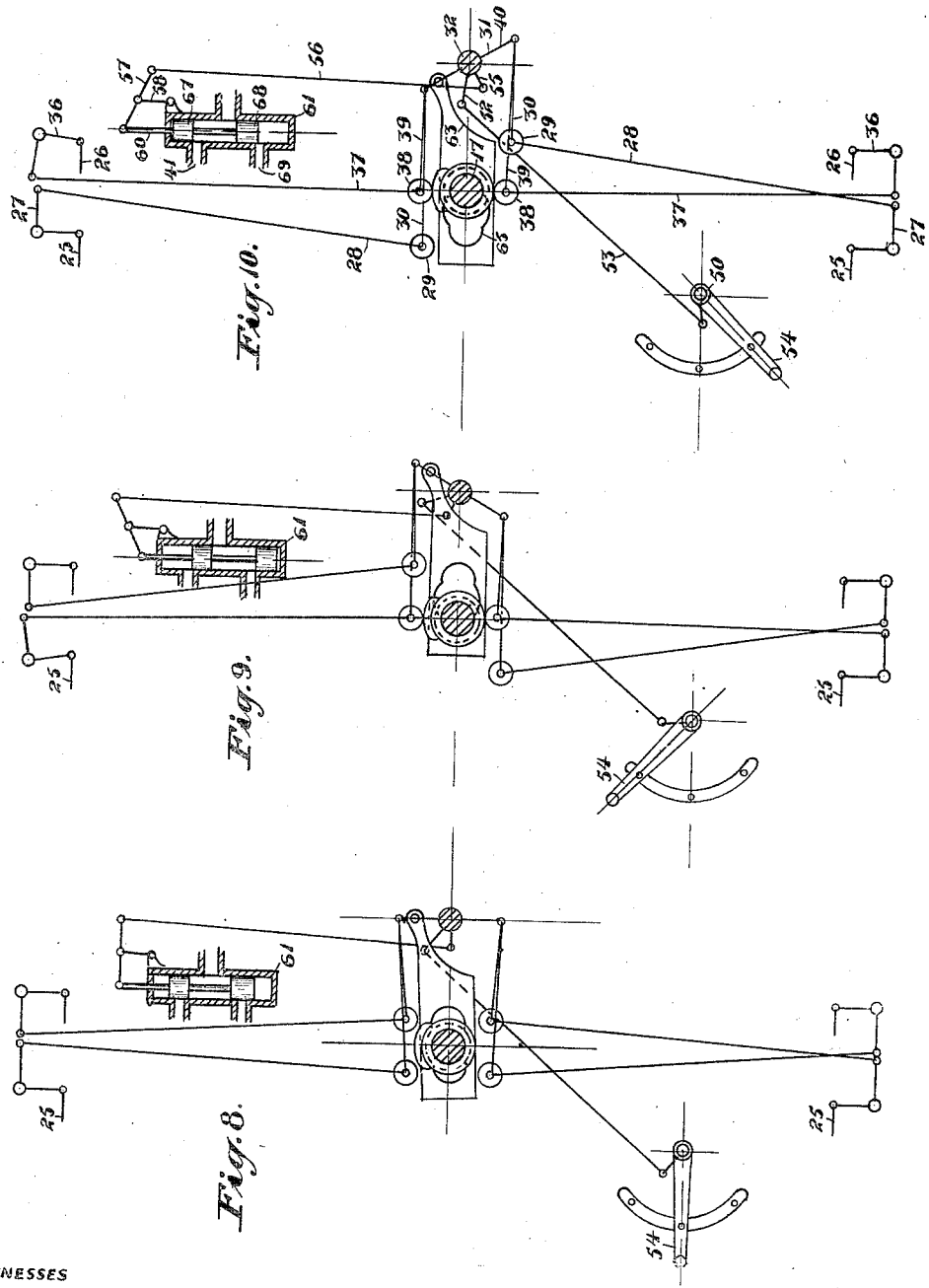

UNITED STATES PATENT OFFICE.

JOHN HAUG, OF BERKELEY, CALIFORNIA.

INTERNAL-COMBUSTION ENGINE.

1,071,156.  Specification of Letters Patent.  Patented Aug. 26, 1913.

Application filed December 21, 1911. Serial No. 667,095.

*To all whom it may concern:*

Be it known that I, JOHN HAUG, a citizen of the United States, residing at Berkeley, in the county of Alameda and State of California, have invented new and useful Improvements in Internal-Combustion Engines, of which the following is a specification.

The object of the present invention is to provide an internal combustion engine of the reciprocating type which will effect an impulse in each stroke of the piston, and will have starting, reversing and operating gear of simple, reliable and direct character so that the engine can be operated in the same manner as an ordinary steam engine.

Figure 1:
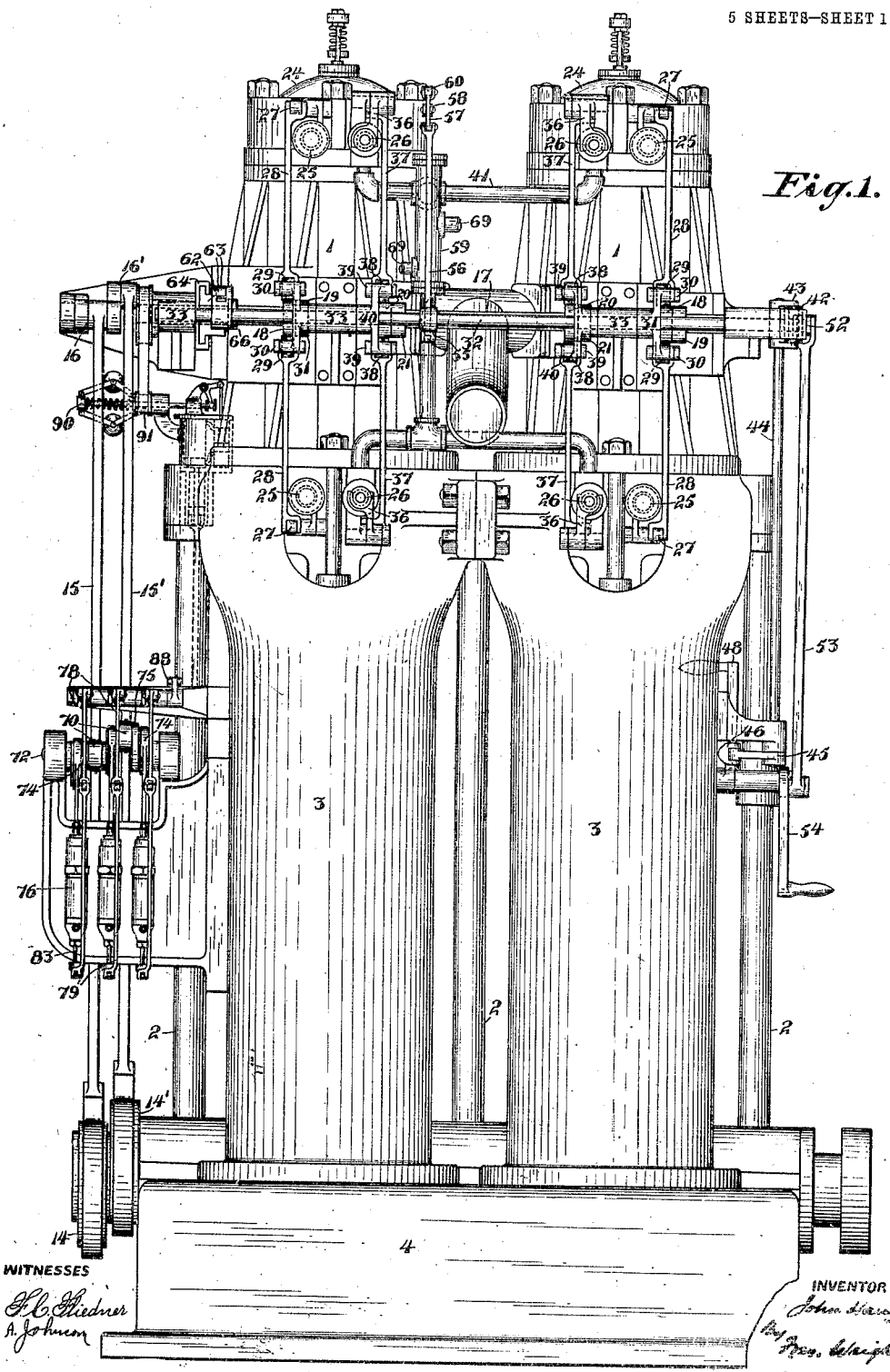
Figure 2:
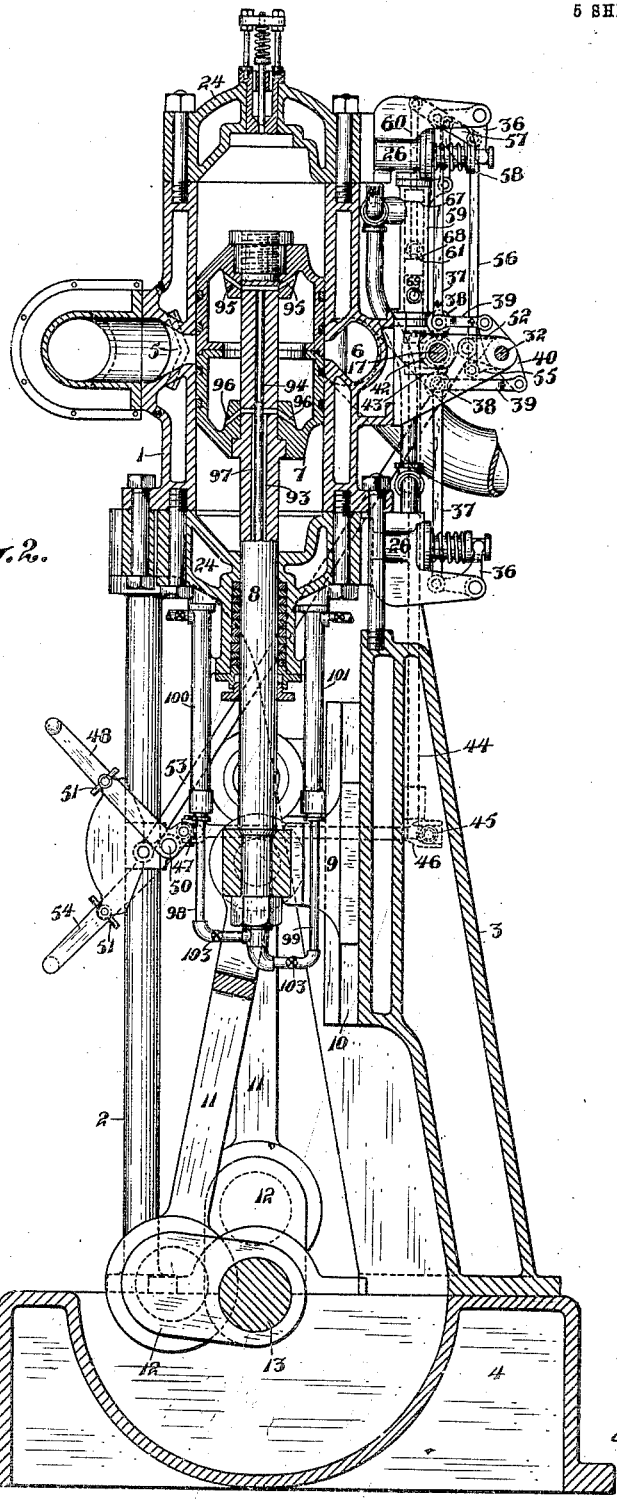
Figure 3:
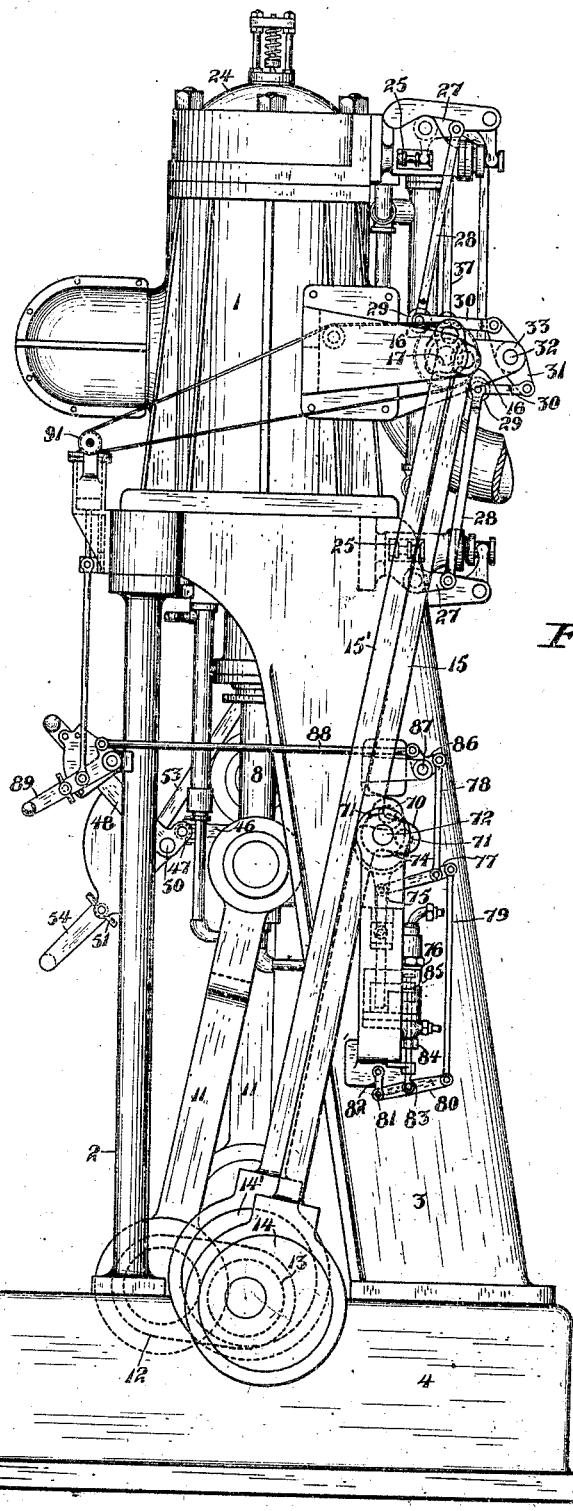

In the accompanying drawings, Figure 1 is a rear view of an internal combustion engine of the two-cycle double-acting type constructed in accordance with my invention; Fig. 2 is a vertical section of the same; Fig. 3 is a side view of the engine; Fig. 4 is an enlarged longitudinal section of a portion of the piston rod; Figs. 5, 6 and 7 are detail views of a controlling device in different positions; Figs. 8, 9 and 10 are diagrammatic views illustrating the mode of regulating the engine.

On referring to the drawing, it will be seen that I here show my improved engine with two cylinders 1, supported at the front upon three pillars 2 and at the rear upon two standards 3, both pillars and standards being supported upon a suitable base 4. Each cylinder is double-acting, and has centrally located, an exhaust port 5 and an admission port 6 for low pressure air to clean out exhaust gases and supply fresh air for the next working stroke of the cylinder. 7 indicates the piston of said cylinder, which passes and opens the said exhaust port 5 and admission port 6. Said piston 7 is connected by a piston rod 8 with a cross head 9, suitably guided in guides 10, and connected by a connecting rod 11 to the head of a crank 12 on a crank shaft 13. Mounted on said crank shaft are two eccentrics 14, 14', which are set at right angles, and have rods 15, 15' connected to the ends of crank arms 16, 16', extending at right angles to one another from a cam shaft 17, thus, from the rotation of the crank shaft, imparting rotation to the cam shaft. Instead of eccentrics, suitable crank arms may be fitted to the crank shaft to serve the same purpose. The cam shaft 17 has for each cylinder two pairs of cams, namely, a cam 18 for opening its fuel valve when going ahead, a cam 19 for opening said valve when going backward, a cam 20 for starting ahead and working with compressed air, and a cam 21 for starting backward and working with the same. For convenience of construction, the cam shaft 17 is arranged at the level of the middle of the cylinders, so that the same cams are available for operating the valve gear at both ends of said cylinders, and the respective parts for the gears at said ends can be duplicates.

The low pressure and high pressure air compressors usually required for this type of engine, the former for clearing the working cylinders of exhaust gases and filling them with air necessary for combustion, and the latter for starting purposes and for injecting and atomizing the fuel oil, are not shown, as they can be of the ordinary construction, and may be driven either by the main engine, or by an independent motor.

The covers 24 at the upper and lower ends of the cylinders are each provided with a fuel oil valve 25 and an air-starting valve 26 of the ordinary construction. The fuel oil valves are operated by bell crank levers 27, connected by rods 28 to cam rollers 29, carried on the ends of links 30, whose other ends are connected to the ends of a lever 31, secured at the middle upon a shaft 32 extending longitudinally behind the cylinders of the engine, and having suitable bearings 33 supported on the cylinders 1. In one position of said lever the rollers are adapted to be actuated either by the cams 18, or by the cams 19, for going ahead or back as the case may be. In another position of said lever they are out of operative relation with said cams. The air-starting valves 26 are operated by bell crank levers 36 connected to rods 37 carrying cam rollers 38, which rollers are also connected to the ends of links 39, the other ends of which are connected to the ends of a lever 40 likewise secured at its middle upon the shaft 32. Said cam-rollers 38, when in proper position according to the angular position of said shaft 32, are adapted to be actuated either by the cams 20 for going ahead or by the cams 21 for reversing.

To bring those cams, of the pairs of cams 18, 19 and 20, 21, which are to govern the direction of motion, into proper alinement with the cam rollers 29 and 38 respectively, the cam shaft is shifted longitudinally and to effect this result a collar 42 on said shaft is engaged by a forked arm 43 mounted upon a vertical shaft 44 the lower end of which carries an arm 45, the outer end of which is connected to one end of a link 46, the other end of which link is connected to an arm 47 of a handlever 48 pivoted upon a shaft 50, supported in bearings secured to one of said pillars 2.

The levers 31 and 40 are so secured to said shaft 32, that when said shaft has been turned so that the cam rollers 29 secured to the ends of links 30 and attached to the lever 31 are in operative relation to the cams 18 and 19 as the case may be, then the cam rollers 38 connected to the links 39 and attached to the ends of the lever 40 are out of operative relation with the cams 20, or 21, and conversely. The driving crank arms 16, 16', at an end of the cam shaft 17 are held in bearings in such a manner that they rotate with said cam shaft, but permit of its sliding therethrough.

To the shaft 32 is secured an arm 52, one end of which is connected to a rod 53, the other end of which rod is connected to a hand lever 54 located in a convenient position, preferably alongside the handlever 48, so that, by operating said hand lever 54, said shaft 32 can be turned, to bring the cam rollers operatively connected with the oil inlet valves into operative relation with their respective cams, while at the same time the cam rollers operatively connected with the compressed air valves are moved out of operative relation with their cams, or conversely. Both of said hand levers 48, 54 are provided with clamping means 51 for clamping them at any desired angular position. A lever 55 is secured to the shaft 32, and to one end of said lever is connected a rod 56, the other end of which is connected to the end of a lever 57 fulcrumed upon a rod 58 extending upwardly from a stationary support, secured on a controlling compressed air valve 61, the other end of said lever 57 being connected to a rod 60 which actuates the said compressed air valve 61, which has two pistons 67, 68 of which the piston 67 controls the entrance to pipes 41 leading to compressed air starting valves 26, while the piston 68 controls the entrance to pipes 69 leading to the fuel valves 25 at the ends of cylinders, so that the entrances to said pipes 41 are opened simultaneously with the bringing into operative relation with their respective cams of the cam rollers connected with the compressed air inlet valves, and the entrances to the pipes 69 are opened simultaneously with the bringing into operative relation with their respective cams of the rollers connected with the fuel valves.

To the shaft 32 is secured an arm 62 to the outer end of which is connected a sliding bar 63 which slides in a guide 64, and has formed therein a slot 65, through which the cam shaft passes. The ends of the slot are semi-circular and of diameter sufficient to permit only the cam shaft to pass therethrough, but its middle portion is of a larger diameter, sufficient to permit a collar 66 on said shaft to pass therethrough. As said shaft 32 is rocked, in either of its two limiting positions the cam shaft passes through an end of said slot, and in these positions, the cam shaft cannot be moved longitudinally, because the collar cannot move through an end of said slot. When in the middle position, the cam shaft passes through the middle of said notch, which, being of larger diameter, permits the collar to move therethrough so that the cam shaft can then be shifted.

In order to avoid excessive vibration of the eccentric rods 15, 15', additional bearings 70 are provided on said rods at the middle of their length, which bearings work on two crank pins 71 of crank shaft 72, and have the same radius of motion as the eccentrics and arms at the ends of the crank shaft 13 and cam shaft 17, and as all points in these rods describe true circles, said rods will, by this eccentric attachment, be effectively steadied. The three arms of this crank shaft 72 are shaped like eccentric sheaves, and are arranged for driving, by means of straps 74, and rods 75, fuel oil pumps 76, the action of these pumps being regulated in the following manner: To the upper ends of the rods 75 are pivotally connected levers 77, the fulcrums of said levers being formed by the lower ends of rods 78 moved in the manner hereinafter described. The outer ends of said levers 77 are connected by links 79 to the ends of levers 80, pivoted at 81 to the lower ends of pivoted hangers 82, said hangers being pivoted upon the pump bodies 76. Rods 83 are pivotally attached to said levers and their upper portions pass through stuffing boxes 84 into the pump bodies 76 terminating under suction valves 85. The upper ends of the rods 78 are connected to levers 86 carried on a shaft 87 which can be turned by a hand lever 89 connected thereto by a link 88. The depression of said hand lever will raise said levers 77, which in turn will raise the levers 80 causing the rods 83 to lift the suction valves 85 from off their seats during the entire stroke and putting the pump out of action.

On raising the hand lever 89 to its extreme upper position, the levers 77, 80 and rods 83 will be lowered, their proportions and movements being such that, in the last named positions, the suction valves will not be lifted, thus permitting the pumps to supply oil during a full stroke. Any intermediate position of the hand lever will result in a correspondingly intermediate period for lifting the suction valve 85, thus accordingly regulating the amount of fuel oil supplied by the pumps. For regulating the oil supply automatically the hand lever 89 may be connected to a governor 90 having an operative connection 91 with the cam shaft.

Proper cooling by the circulation of water through the cylinder jackets and covers is provided for in the usual manner, but special means for this purpose are shown as applied to each piston 7 and piston rod 8. Said piston rod has a central bore 93, the part of which extending as far as the lower end of the piston is of larger diameter than the remainder, extending as far as the upper end of the piston. A tube 94 fits snugly in the reduced upper end of the bore and communicates at said upper end with passages 95 leading to the upper end of the interior of the hollow piston. Passages 96 also lead from the lower end of the interior of said piston to the annular space 97 around the tube 94. At its lower end, said annular space is connected with an inlet conduit 98 and at its lower end the tube 97 is connected to an outlet conduit 99. These conduits 98, 99 telescope in conduits 100, 101, stuffing boxes 102 being provided to make water-tight joints therebetween. Check valves 103 are provided in the conduits 98, 99, 100, 101. Cooling water flows by the conduits 100, 98, annular space 97 passages 96 to the interior of the hollow piston, then upward therein, then from said interior through the passages 95, tube 94, and conduits 99, 101. The telescoping union of the conduits 98, 99 with the conduits 100, 101 permits of the circulation of cooling water in the piston and piston rod notwithstanding their reciprocating motion. Said reciprocating motion by reason of the check valves 103, has the effect of causing a pumping action, which insures the circulation of the cooling water.

Since, in this type of engine, it is important to effect a compression in the cylinders which will raise the temperature of the air contained therein sufficiently to ignite the fuel oil, the piston 7 is made in two halves, united in the center, and held together by the piston rod 8, as shown, so that if the degree of compression should at any time become insufficient, the piston can be lengthened by inserting a suitable ring in the center joint, thus reducing the clearance space, and increasing the degree of compression. The proper proportion of the clearance at the top and bottom of each cylinder can be regulated by adjusting the length of the connecting rod in the usual manner.

In starting engines with the above described improvements, the provision of two cylinders operating on cranks ninety degrees apart will be sufficient to eliminate all so-called dead centers, so that the engine can be started by the compressed air device from any position and in any direction required.

The following is the mode of operation of the engine:—Fig. 10 is a diagrammatic view showing the position of the valve mechanism when compressed air is the motive force for starting ahead. In this case the valves 26 open and since the two cylinders operate on cranks ninety degrees apart, it results that, in at least one of these cylinders, compressed air has free access either to the top or bottom of that cylinder. The admission of compressed air imparts an impulse to the piston of the latter cylinder starting the engine, and, upon the passage of the other piston to either end of the cylinder, compressed air is also admitted to its cylinder. When the engine has attained sufficient speed, and it is desired to change the motive power from compressed air to oil, the handlever 54 is moved into its opposite position, as shown in Fig. 9, turning the shaft 32 and closing, by means of the lever 55, rod 56, and lever 57, the pipes 41 by means of the piston 67, and at the same time opening fuel valves 25, so that compressed air, for spraying and atomizing fuel, may be admitted to said valves, also by means of the lever 40 and the links 39, removing from their respective cams the cam rollers which actuate the compressed air valves and placing in operative relation with their respective cams the cam rollers which operate the fuel valves. The hand lever 89 is at the same time placed in a proper position to regulate the fuel oil pumps for the required quantity of fuel, and its position can be gradually adjusted until the engine runs at its proper speed.

When it is desired to reverse the engine, the hand lever 54 is placed in its middle position, as shown in Fig. 8, which operation, by moving the shaft 32, withdraws the cam rollers for operating both the compressed air valves and the fuel valves from operative relation with their respective cams, thus causing all valves to be closed. The fuel pumps are put out of action by hand-lever 89. The sliding bar 63 is now in its middle position, as shown in Fig. 8 (also shown in Fig. 6) permitting the collar 66 on the cam shaft to pass so that the cam shaft can be shifted. This is done by means of the hand lever 48, link 46, arm 45, shaft 44 and the forked arm 43, so that, instead of the cams 18 and 20, the cams 19 and 21 are ready to be brought into operative relation with the rollers 29 and 39 respectively. The hand lever 54 is now moved to its lower position operating the valve 61 to open the pipes 41 leading to the compressed air starting valves, and at the same time bringing the cam rollers 38 into operative relation with their cams, so that the compressed air valves 26 can be opened by said cams and the engine will start back with compressed air, all parts being in the position shown in Fig. 10.

When it is desired to operate in the reverse direction with oil, the handlever 54 is moved into its opposite position, actuating the compressed air valve 61 to close the pipes 41 and open the pipes 69 leading to the fuel valves 25, also moving away from their cams the cam rollers which actuate the compressed air valves 26 and placing in operative relation with their cams the cam rollers which actuate the fuel valves 25 all parts being in a position shown in Fig. 9. The hand lever 89 is at the same time adjusted as before described to put the fuel pumps into action.

A slight advance or retardation of the point at which either the compressed air valves or the fuel valves begin to act may be obtained by a slight change in the position of the handlever 54 when the same is in either one of its extreme positions, as will be readily understood by any one skilled in mechanical engineering.

It may be added that, during periods of maneuvering, the governor 99 may be detached from its connection with the hand lever 89, if advantageous to regulate the speed by hand.

I claim:—

1. In an internal combustion engine, the combination of a cylinder, a reciprocable piston therein, a fuel valve and a compressed air valve at each end of the cylinder, a cam shaft rotated by the engine, two cams thereon, pairs of cam rollers therefor, of which the rollers of one pair are operatively related to the fuel valves at the ends of the cylinder, and the rollers of the other pair are operatively related to the compressed air valves, a rock shaft operatively connected to said cam rollers, and means for rocking said shaft to move either pair of cam rollers into, and the other pair out of, position relatively to their respective cams, to open their valves at the proper time in the rotation of the cam shaft.

2. In an internal combustion engine, the combination of a cylinder, a reciprocable piston therein, means for separately conducting oil and compressed air to each end of said cylinder, valves at each end of the cylinder for controlling said oil and air conduits, a cam shaft rotated by the engine, two pairs of cams thereon, cam rollers therefor, operative connections between the cam rollers of one pair of cams and the valves for admitting compressed air, and between those of the other pair and the valves for admitting fuel oil, the cams of each pair being so arranged on the cam shaft as to actuate said rollers to open said valves to admit fuel oil at the proper time for going ahead or backward respectively, and means for shifting said shaft longitudinally.

3. In an internal combustion engine, the combination of a cylinder, a reciprocable piston therein, a fuel oil valve and a compressed air valve at each end of the cylinder, a cam shaft rotated by the engine, two pairs of cams thereon, the cams of each pair being operatively related to the valves at the ends of the cylinder so as to admit the motor fluid through said valves at the proper time to propel the engine forward or backward respectively, and the cams of one pair being operatively related to the compressed air valves, and of the other pair being operatively related to the fuel oil valves, means for shifting longitudinally said cam shaft to move one cam of each pair out of, and the other cam into, operative relation with the corresponding valve, cam rollers for said cams, a rock shaft and means for rocking said rock shaft to operatively connect a cam of one pair with its valve, and operatively disconnect a cam of the other pair from its valve with its valve.

4. In an internal combustion engine, a cylinder, a piston reciprocable therein, conduits for fuel and compressed air leading into each end of said cylinder, valves at the entrances of said conduits into the cylinders, a valve for controlling the compressed air supplied to both ends, a cam shaft rotating with the reciprocation of the piston, cams thereon, cam rollers operatively connected with said first-named valves, a rock shaft, means connecting said rock shaft with said cam rollers, whereby, on the rocking of said shaft, a cam roller is moved into position to be operated by said cam shaft, and an operative connection between said rock shaft and controlling valve, whereby, in one angular position of said rock shaft, said valve is actuated simultaneously with the movement of one of said cam rollers into operative position.

5. In an internal combustion engine, a cylinder, a piston reciprocable therein, conduits into each end of said cylinder for fuel and compressed air, valves at the entrances of said conduits into the cylinder, a controlling valve arranged in one position to close both of the compressed air conduits, a cam shaft rotating with the reciprocation of the piston, cams thereon, pairs of cam rollers operatively connected with said first-named valves, a rock shaft, means connecting said rock shaft with cam rollers of said pairs whereby, on the rocking of said shaft, one pair is adapted to be moved into position to be operated by said cam shaft, and an operative connection between said rock shaft and controlling valve, whereby, in one angular position of said rock shaft, said controlling valve is moved, to close the compressed air conduit leading to the compressed air valves, simultaneously with the movement into operative position of the pair of cam rollers which actuate the fuel valves and into another position said third valve is moved to admit compressed air to the compressed air valves, simultaneously with the movement into operative position of the pair of cam rollers which actuate the compressed air valves.

6. In an internal combustion engine, a cylinder, a piston reciprocable therein, conduits into said cylinder for fuel and compressed air, valves at the entrances of said conduits into the cylinder, a conduit from the compressed air conduit to the fuel conduit, a controlling valve arranged in each of its limiting positions to close one and open the other of the compressed air conduits leading to the compressed air and fuel valves, a cam shaft rotating with the reciprocation of the piston, cam thereon, cam rollers operatively connected with said first-named valves, a rock shaft, means connecting said rock shaft with said cam rollers whereby, on the rocking of said shaft, a cam roller is adapted to be moved into position to be operated by said cam shaft, and an operative connection between said rock shaft and controlling valve, whereby, in one angular position of said rock shaft, said controlling valve is moved to close the compressed air conduit leading to the compressed air valve and open the compressed air conduit leading to the fuel valve simultaneously with the movement into operative position of the cam roller to actuate the fuel valve, and into another position said controlling valve is moved to open the compressed air conduit leading to the compressed air valve and close the compressed air conduit leading to the fuel valve simultaneously with the movement into operative position of the cam roller which actuates the compressed air valve.

7. In an internal combustion engine, a cylinder, a piston reciprocable therein, conduits into each end of said cylinder for fuel and compressed air, valves at the entrances of said conduits into the cylinder, a pair of compressed air conduits leading to the fuel conduits, a controlling valve arranged in each of its limiting positions to close one and open the other of the two pairs of compressed air conduits leading to the compressed air and fuel valves, a cam shaft rotating with the reciprocation of the piston, cams thereon, pairs of cam rollers operatively connected with said first named valves respectively, a rock shaft, means connecting said rock shaft with said cam rollers whereby, on the rocking of said shaft, a pair of cam rollers is adapted to be moved into position to be operated by said cam shaft, and an operative connection between said rock shaft and controlling valve, whereby, in one angular position of said rock shaft, said controlling valve is moved to close the pair of compressed air conduits leading to the compressed air valves, and open the pair of compressed air conduits leading to the fuel valves simultaneously with the movement into operative position of the pair of cam rollers which actuate the fuel valves, and in another position said controlling valve is moved to open the pair of compressed air conduits leading to the pair of compressed air valves and close the pair of compressed air conduits leading to the fuel valves simultaneously with the movement into operative position of the cam rollers which actuate the compressed air valves.

8. In an internal combustion engine, a cylinder, a piston reciprocable therein, conduits into each end of said cylinder for fuel and compressed air, valves at the entrances of said conduits into the cylinder, a pair of compressed air conduits leading to the fuel conduits, a controlling valve arranged in an intermediate position to close the compressed air conduits leading to the compressed air and fuel valves, and in each of two other positions to open alternately one pair of said conduits and close the other pair, a cam shaft rotating with the reciprocation of the piston, a cam thereon, pairs of cam rollers operatively connected with said first-named valves, a rock shaft, means connecting said rock shaft with said cam rollers whereby, on the rocking of said shaft, a pair of cam rollers are adapted to be moved into position to be operated by said cam shaft, and an operative connection between said rock shaft and controlling valve, whereby, in one angular position of said rock shaft, said controlling valve is moved to close the compressed air conduits leading to the compressed air valves, and open the compressed air conduits leading to the fuel valves simultaneously with the movement into operative position of the cam rollers which actuate the fuel valves, and in another position said controlling valve is moved to open the compressed air conduits leading to the compressed air valves and close the compressed air conduits leading to the fuel valves simultaneously with the movement into operative position of the cam rollers which actuate the compressed air valves, and in an intermediate position to close all of said conduits and to render both of said cam rollers inoperative.

9. In an internal combustion engine, the combination of a cylinder, fuel and compressed air conduits leading to both ends of the cylinder, valves controlling the entrances thereof into the cylinder, pairs of cam rollers, the cam rollers of each pair being each operatively connected with valves at opposite ends of the cylinder respectively, a piston reciprocable in the cylinder, a cam shaft rotating with the reciprocation of the piston, two pairs of cams thereon, means whereby either pair of cam rollers, exclusively of the other, is adapted to be moved into operative relation with the corresponding cam of the corresponding pair, means for shifting said cam shaft longitudinally, whereby each pair of cam rollers is adapted to be brought into operative relation with the other cam of said pair, a stop, movable with said means for moving the cam rollers, for preventing the longitudinal movement of said cam shaft, said stop being operative in either of the positions to which it is moved when a cam roller is brought into operative relation with a cam, but inoperative when neither cam roller is in such operative relation, a projection secured on said shaft, and a device movable with the means for moving the cam rollers into and out of operative relation, said device being movable transversely to the shaft and closely adjacent to the collar, and having parts against which the projection abuts in the longitudinal movement of the shaft when the device is in either of its terminal positions of movement, said projection being free to pass the device when the latter is in its intermediate position.

In testimony whereof I have hereunto set my hand in the presence of two subscribing witnesses.

JOHN HAUG.

Witnesses:
F. M. WRIGHT,
D. B. RICHARDS.

---

Copies of this patent may be obtained for five cents each, by addressing the "Commissioner of Patents, Washington, D. C."